(12) United States Patent
Martin (10) Patent No.: US 11,240,703 B2
(45) Date of Patent: Feb. 1, 2022

(54) COMMUNICATIONS DEVICES, METHOD AND MOBILE COMMUNICATIONS SYSTEM

(71) Applicant: Sony Corporation, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 92 days.

(21) Appl. No.: 16/334,760

(22) PCT Filed: Sep. 18, 2017

(86) PCT No.: PCT/EP2017/073442
§ 371 (c)(1),
(2) Date: Mar. 20, 2019

(87) PCT Pub. No.: WO2018/059983
PCT Pub. Date: Apr. 5, 2018

(65) Prior Publication Data
US 2019/0239114 A1      Aug. 1, 2019

(30) Foreign Application Priority Data

Sep. 30, 2016   (EP) ..................................... 16191991

(51) Int. Cl.
*H04W 28/02* (2009.01)
*H04W 72/12* (2009.01)
(Continued)

(52) U.S. Cl.
CPC .......... *H04W 28/0278* (2013.01); *H04L 1/00* (2013.01); *H04L 1/187* (2013.01);
(Continued)

(58) Field of Classification Search
CPC ......... H04W 28/0278; H04W 72/1252; H04W 28/065; H04W 88/04; H04L 1/00; H04L 1/187; H04L 47/30
See application file for complete search history.

(56) References Cited

U.S. PATENT DOCUMENTS 8,483,062 B2    7/2013  Yi et al.
2004/0047331 A1  3/2004  Jang
(Continued)

FOREIGN PATENT DOCUMENTS

WO    2016/005267 A1    1/2016
WO    2017/194326 A1    11/2017

OTHER PUBLICATIONS

Leon-Garcia et al., Communication Networks Fundamental Concepts and Key Architectures, 2003, McGraw-Hill, Second Edition, pp. 48-49 (Year: 2003).*

(Continued)

*Primary Examiner* — Omar J Ghowrwal
(74) *Attorney, Agent, or Firm* — Xsensus LLP (57) ABSTRACT

A communications device acting as a relay device is configured to communicate with a transmitting node and a receiving node. The communications device acting as the relay is configured to receive signals representing protocol data units formed from one or more service data units via a first wireless access interface from the transmitting node according to a first automatic repeat request process for transmission to the receiving node, transmit signals representing the received protocol data units via a second wireless access interface to the receiving node according to a second automatic repeat request process, and store the protocol data units received by the receiver circuitry for transmission to the receiving node according to the second automatic repeat request process.

12 Claims, 7 Drawing Sheets

(51) Int. Cl.
*H04L 1/00* (2006.01)
*H04L 1/18* (2006.01)
*H04W 28/06* (2009.01)
*H04L 12/835* (2013.01)
*H04W 88/04* (2009.01)

(52) U.S. Cl.
CPC ......... *H04W 72/1252* (2013.01); *H04L 47/30* (2013.01); *H04W 28/065* (2013.01); *H04W 88/04* (2013.01)

(56) References Cited

U.S. PATENT DOCUMENTS

| | | | | |
|---|---|---|---|---|
| 2009/0303947 | A1* | 12/2009 | Karino | H04W 28/22 370/329 |
| 2010/0177733 | A1* | 7/2010 | Yi | H04L 1/1685 370/331 |
| 2011/0164694 | A1 | 7/2011 | Yamasaki et al. | |
| 2012/0230245 | A1* | 9/2012 | Ostergaard | H04L 1/1893 370/315 |
| 2017/0085356 | A1* | 3/2017 | Lin | H04L 1/0041 |

OTHER PUBLICATIONS

Rossi et al., "On the UMTS RLC Parameters Setting and their impact on Higher Layers Performance", 2003 IEEE 58th Vehicular Technology Conference. VTC 2003—Fall (IEEE Cat. No. 03CH37484), Orlando FL USA, Oct. 6-9, 2003, 6 Pages.
LG Electronics, "Enhancements of relayed Connection via WLAN and LTE Sidelink (ECO)", Motivation for New SI, RP-160241, 7 Pages.
China Telecom, "Discussion on UE Relay for eMBB and IoT", 3GPP TSG RAN Meeting No. 71 RP-160247, Göteborg, Sweden, Mar. 7-10, 2016, 7 Pages.
Qualcomm, "Motivation for SI proposal on further enhancements to LTE Device to Device", RP-160268, pp. 1-10.
ZTE, "Motivation for new Work Item on D2D communication for commercial use cases", 3GPP TSG RAN Meeting No. 71 RP-160283, Goteborg, Sweden, Mar. 7-10, 2016, 8 Pages.
Huawei et al., "L2 UE-to-Network Relay for E-UTRAN", 3GPP TSG-RAN No. 71 RP-160415, Göteborg, Sweden, Mar. 7-10, 2016, pp. 1-4.
Intel, "Motivation for SI: Further LTE D2D Enhancements for wearables and MTC", 3GPP TSG RAN Meeting No. 71 RP-160427, Göteborg, Sweden, Mar. 7-10, 2016, pp. 1-14.
Qualcomm Incorporated et al., "Revision of SI: Further Enhancements LTE Device to Device, UE to Network Relays for IoT and Wearables", 3GPP TSG RAN Meeting No. 72 RP-161303, Busan Korea, Jun. 13-16, 2016, 7 Pages.
Alcaraz et al., "Optimizing TCP and RLC Interaction in the UMTS Radio Access Network", IEEE Network, Mar.-Apr. 2006, pp. 1-10.
3GPP, "Technical Specification Group Radio Access Network;Evolved Universal Terrestrial Radio Access (E-UTRA); User Equipment (UE) radio access capabilities", Release 13, 3GPP TS 36.306, vol. 13.2.0, Jun. 2016, pp. 1-61.
3GPP, "Technical Specification Group Radio Access Network; Evolved Universal Terrestrial Radio Access (E-UTRA); Radio Link Control (RLC) protocol specification", Release 13, 3GPP TS 36.322, vol. 13.2.0, Jun. 2016, pp. 1-45.
Qualcomm Incorporated, "New Work Item: NarrowBand IOT (NB-IOT)", 3GPP TSG RAN Meeting No. 69 RP-151621, Phoenix, USA, Sep. 14-16, 2015, 9 pages.
Qualcomm Incorporated et al.,"New SI: Further Enhancements to LTE Device to Device, UE to Network Relays for Wearables", 3GPP TSG RAN Meeting No. 71 RP-160677, Gothenburg, Sweden, Mar. 7-10, 2016, 7 pages.
Holma et al., "LTE for UMTS OFDMA and SC-FDMA Based Radio Access", Wiley 2009, System Architecture Based on 3GPP SAE, 11 pages.
International Search Report dated Dec. 22, 2017, PCT/EP2017/073442, filed on Sep. 18, 2017, 9 pages.
Sharetechnote, "RLC", 37 pages.

\* cited by examiner

COMMUNICATIONS DEVICES, METHOD AND MOBILE COMMUNICATIONS SYSTEM

CROSS-REFERENCE TO RELATED APPLICATIONS

The present application is based on PCT filing PCT/EP2017/073442, filed Sep. 18, 2017 which claims priority to EP 16191991.5 filed Sep. 30, 2016, the entire contents of which are incorporated herein by reference.

BACKGROUND

Field of Disclosure

The present disclosure relates to communications devices acting as relay devices which are configured to relay signals comprising protocol data units (PDUs) from a transmitting node to a receiving node in a mobile communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to embodiments of the present disclosure, there is provided a communications device acting as a relay device configured to communicate with a transmitting node operating with a mobile communications network and a receiving node operating with the mobile communications network. The communications device acting as the relay device comprises receiver circuitry configured to receive signals representing protocol data units formed from one or more service data units via a first wireless access interface from the transmitting node according to a first automatic repeat request process for transmission to the receiving node, transmitter circuitry configured to transmit signals representing the received protocol data units via a second wireless access interface to the receiving node according to a second automatic repeat request process, controller circuitry configured to control the transmitter circuitry to transmit the signals and to control the receiver circuitry to receive the signals to transmit, and a buffer configured to store the protocol data units received by the receiver circuitry for transmission to the receiving node according to the second automatic repeat request process. If the number of protocol data units or number of bytes stored in the buffer exceeds a predetermined threshold, the controller circuitry is configured in combination with the transmitter circuitry and the buffer to transmit to the transmitting node an indication that the number of protocol data units or the number of bytes stored in the buffer exceeds the predetermined threshold.

In embodiments of the present technique, the transmitting node may be a communications device, or an infrastructure equipment. In embodiments of the present technique, the receiving node may be a communications device or an infrastructure equipment. Accordingly, embodiments of the present technique may include the relaying of signals on the downlink received by a communications device acting as the relay device from an infrastructure equipment and relayed to a receiving communications device, the relaying of signals on the uplink received by the communications device acting as the relay device from a transmitting communications device and relayed to an infrastructure equipment, or the D2D relaying of signals between two communications devices.

In embodiments of the present technique, the buffer is a first buffer, the first buffer being a transmission buffer configured to receive the protocol data units formed from the one or more service data units received from the receiver circuitry for transmission to the receiving node according to the second automatic repeat request process from a second buffer, the second buffer being a reception buffer.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System and Relay Nodes

Figure 1:
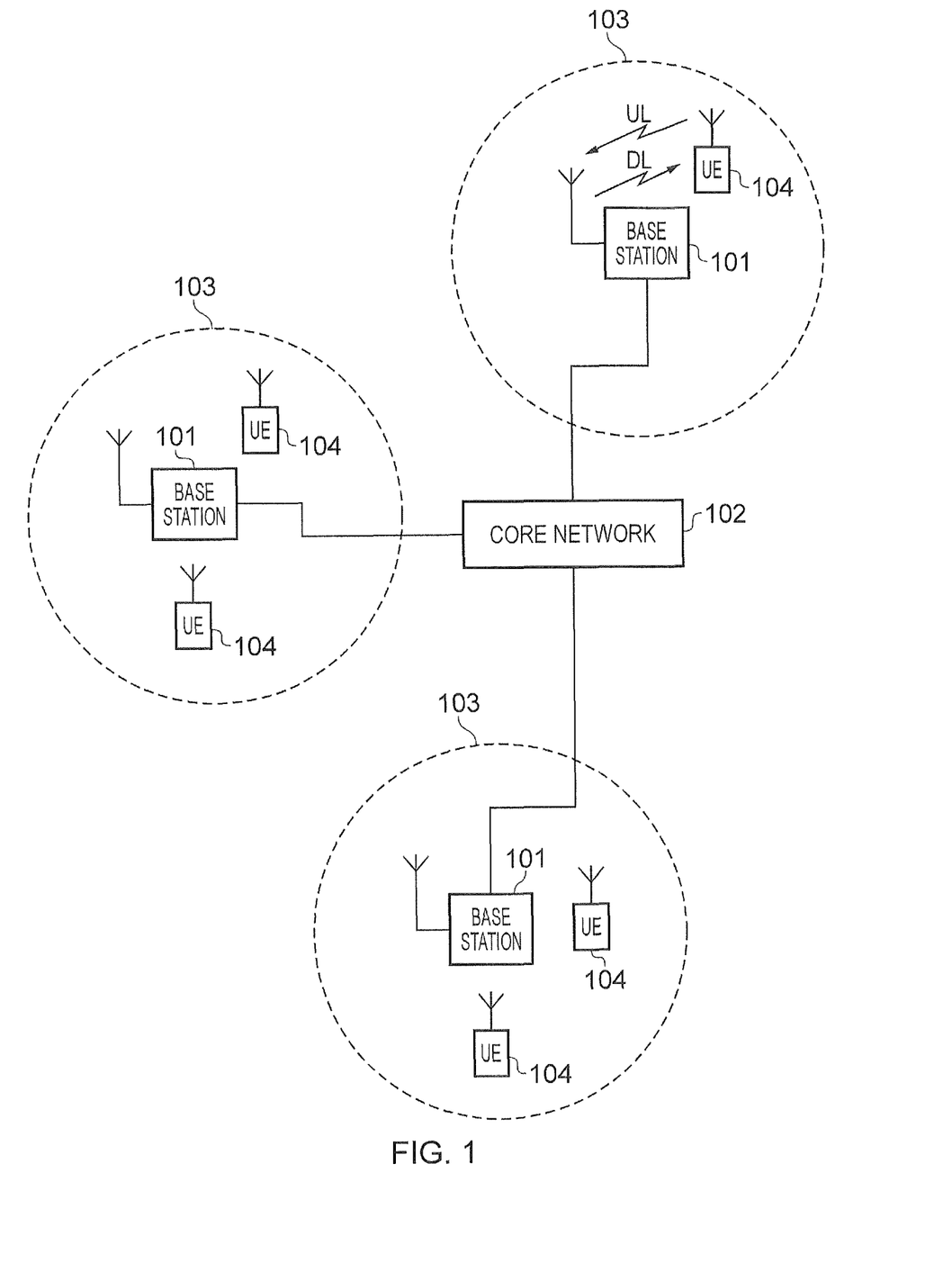
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced.

Figure 2:
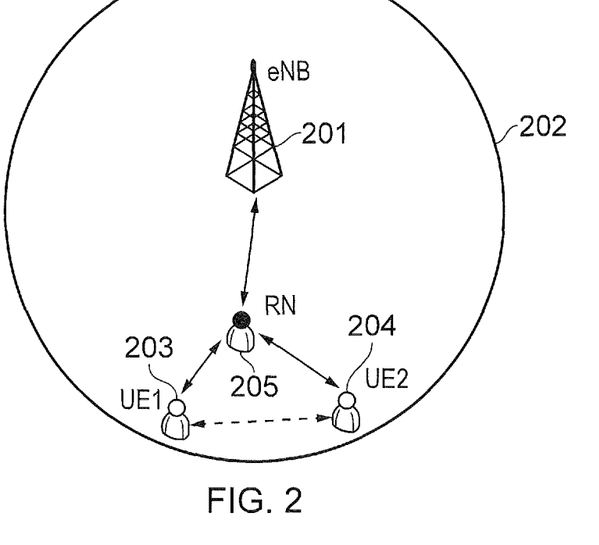
FIG. 2 illustrates an example of D2D communications using a relay node.

FIG. 2 illustrates an example network comprising an eNodeB 201 with a coverage area 202. Two UEs 203 and 204 may communicate with one another using device-to-device (D2D) communications. To communicate with the eNodeB 201, each of the UEs 203 and 204 communicate with a relay node 205, which then relays signals to and from the eNodeB 201. In the example of FIG. 2, both UEs 203 and 204 are inside the coverage area 202 of the eNodeB 201, so signals are not necessarily being relayed for coverage purposes. For example, the UEs 203 and 204 may be low power devices, and so communicating with the relay node 205 consumes less power (as communications are over a shorter range) than communicating directly with the eNodeB 201 would do.

A relay node can generally be defined as a wireless radio access point for relaying transmission and which thus does not implement all of the functionalities of a base station. It is in general not directly connected to the core network but uses wireless access (inband or outband) for backhaul link to connect with a base station.

In other examples, the backhaul link may also be provided over a wired connection. Relay technologies are known generally to provide an arrangement for receiving signals from a base station and for retransmitting the received signals to a UE in a mobile communications network, or to receive signals transmitted from a UE for re-transmission to a base station of a mobile communications network.

Narrowband Internet of Things and Machine Type Communications

In 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilising for example the spectrum currently being used by GERAN systems as a replacement of one or more GSM carriers 2. 'Guard band operation' utilising the unused resource blocks within a LTE carrier's guard-band 3. 'In-band operation' utilising resource blocks within a normal LTE carrier One of the objectives of NB-IoT is to allow the cost of devices to be as low as possible. This is also an objective of Low Complexity Machine Type Communication (LC-MTC). LC-MTC terminal devices (UEs) also implement new LTE features which are currently being specified in 3GPP. The main features of LC-MTC UE are low complexity (and therefore low cost), coverage enhancement and reduced power consumption.

Wearable devices (such as smartwatches and the like) are examples of devices which may make use of NB-IoT or LC-MTC communications systems. In 3GPP Rd. 14 a study item into further enhancements to LTE D2D communications, network relays for IoT and wearable devices has been approved [3], including the enhancement of D2D to be more suitable for lower cost/complexity (e.g. wearable) devices. The first phase of the study will evaluate scenarios and requirements with the intention of refining and updating current objectives. In addition to this, it has been agreed that relay technologies will form part of the future work on new radio access technology (RAT) for fifth generation (5G) wireless communication systems. It is anticipated that enhancements made to LTE D2D will also be applicable to these 5G systems.

Employment of Relay Nodes for Wearable Devices

One of the benefits of connecting indirectly to the network via a relay is that a remote device (e.g. a wearable device such as a smart watch) may reduce its power consumption, since uplink transmissions can be performed at a much shorter range to the relay device, rather than to the eNodeB. One potential realisation of this would be to utilise a narrowband channel similar to eMTC or NR-IoT for the relay link. This would be suitable for sending (and also potentially receiving) small amounts of data via the relay. Another possibility would be to use Bluetooth® or Wi-Fi®) for the relay link (sidelink).

Figure 3:
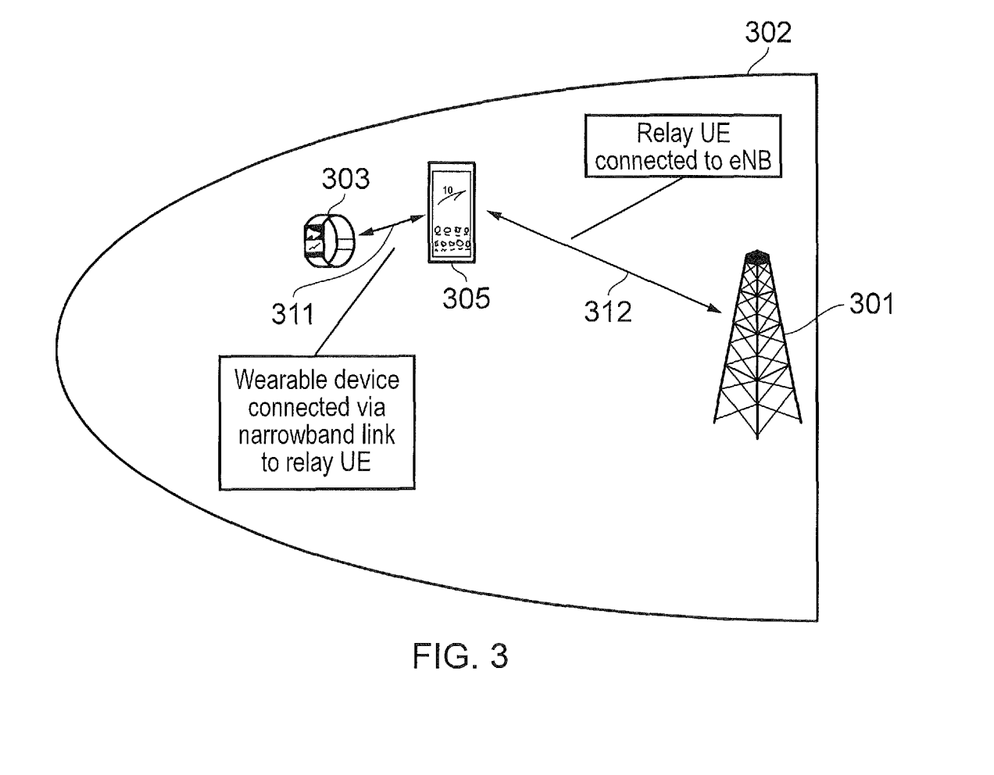
FIG. 3 illustrates an example scenario in which a remote wearable device may communicate with an eNodeB using a communications device as a relay node.

FIG. 3 illustrates an example scenario in which a remote wearable device 303 may communicate with an eNodeB 301 using a communications device 305 as a relay node. The eNodeB 301 has a coverage area 302, which the remote wearable device 303 and communications device 305 are within. The remote wearable device 303 is connected by a narrowband link 311 to the communications device 305, and the communications device is connected by a conventional link 312 to the eNodeB 301. The remote wearable device 303 may be, for example, a smartwatch, while the communications device 305 may be, for example a smartphone. The owner of the smartwatch may also own the smartphone, or alternatively, they may be owned by separate users.

The wearables study has so far considered power saving and complexity reduction for the remote (wearable) device 303. However, it is also important to optimise and simplify the functionality of the relay device 305. Particularly when the relay device 305 is a smartphone, power consumption and processing load is extremely important, because the user will notice a reduction in performance of the device when wearables are connected and will impact the overall experience. Particularly if use consent is needed for a third party wearable device to connect then this is unlikely to be enabled if there is a significant or noticeable difference in performance. Embodiments of the present disclosure attempt to optimise user-plane relaying operation at the radio link control (RLC) layer.

Current RLC Model for LTE and State Variables

Figure 4:
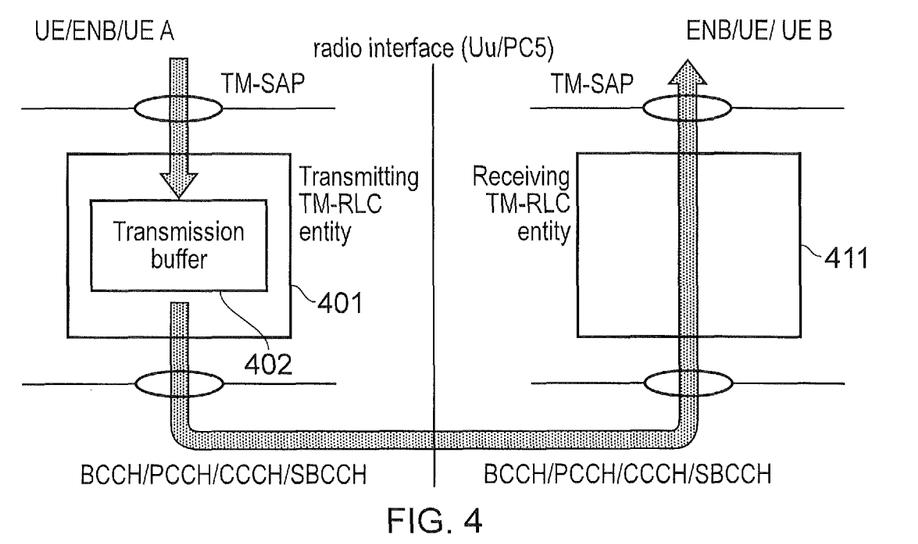
FIG. 4 shows a model of two transparent mode peer entities in accordance with the 3GPP LTE RLC specification.
Figure 5:
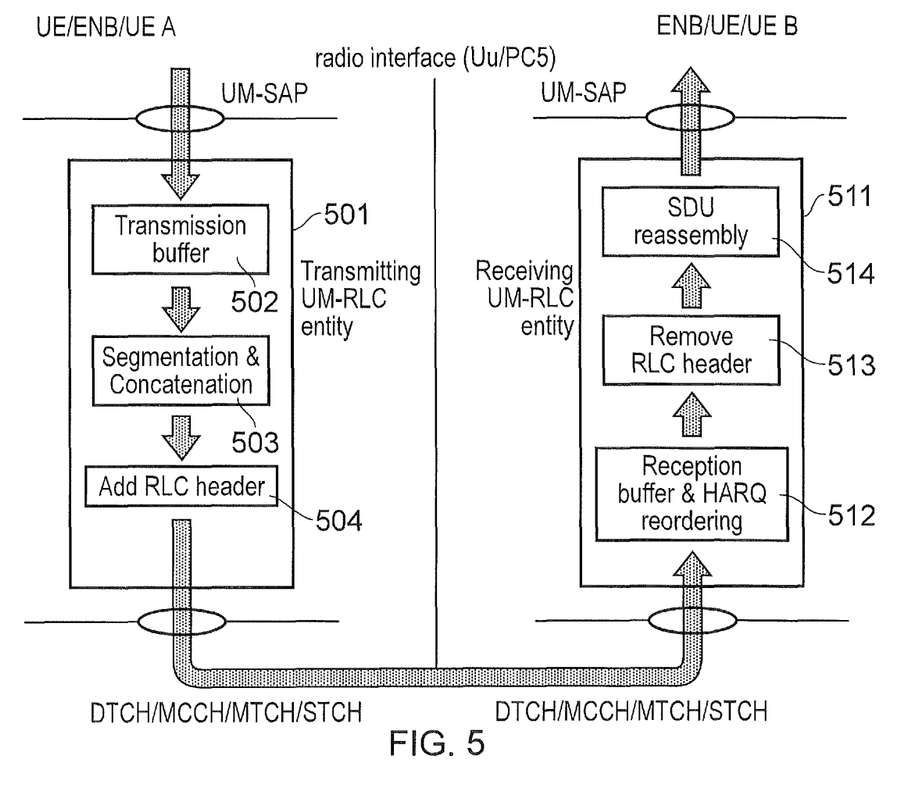
FIG. 5 shows a model of two unacknowledged mode peer entities in accordance with the 3GPP LTE RLC specification.
Figure 6:
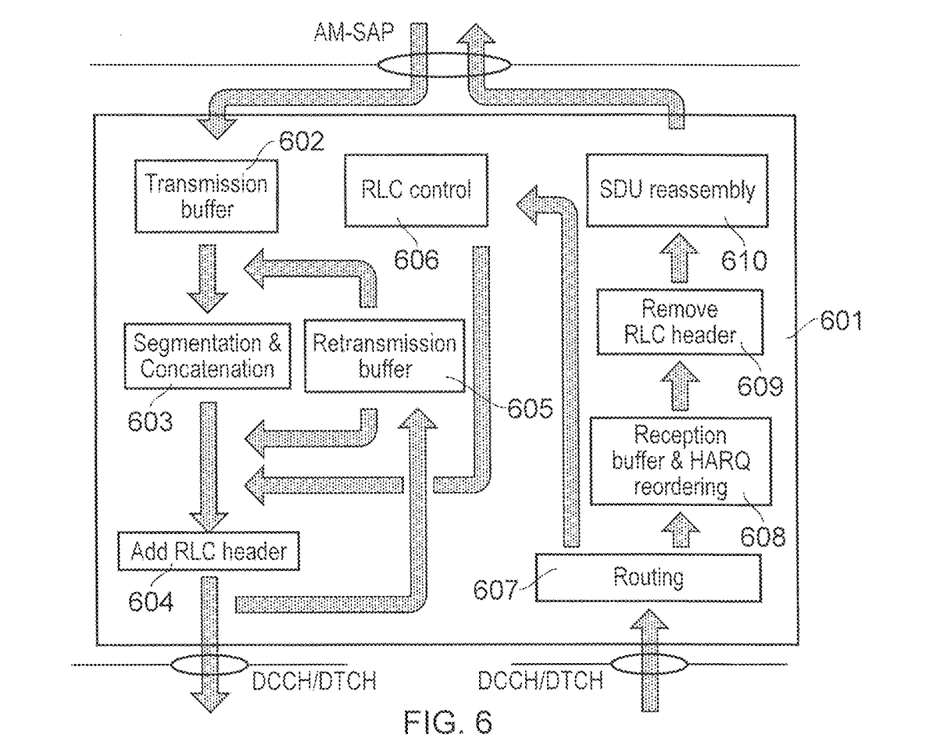
FIG. 6 shows a model of an acknowledged mode entity in accordance with the 3GPP LTE RLC specification.

FIGS. 4 to 6, which are described in detail in the following paragraphs, are taken from the 3GPP TS 36.322 specification [4] defining the RLC layer (layer 2) for LTE. A more detailed description may be found by referring to subclause 4.2 of the same specification, which contains a textual description of the architecture and the main functions performed by the entities shown in FIGS. 4 to 6. Some of the textual description from [4] is used in the description of FIGS. 4 to 6 in the following paragraphs.

FIG. 4 shows a transmitting transparent mode (TM) RLC entity 401, which comprises a transmission buffer 402. The transmitting TM RLC entity 401 is configured to transmit TM data protocol data units (TMD PDUs) formed from RLC service data units (RLC SDUs) (without segmenting or concatenating the RLC SDUs or including any RLC headers in the TMD PDUs) to a receiving TM RLC entity 411.

FIG. 5 shows a transmitting unacknowledged mode (UM) RLC entity 501, which comprises a transmission buffer 502, segmentation and concatenation means 503 and RLC header addition means 504. The transmitting UM RLC entity 501 is configured to segment and/or concatenate 503 the RLC SDUs so that the UMD PDUs fit within the total size of RLC PDU(s) indicated by a lower layer at the particular transmission opportunity notified by lower layer, and to include relevant RLC headers 504 in the UMD PDU, before transmitting the UMD PDUs to a receiving UM RLC entity 511. The receiving UM RLC entity 511 comprises a reception buffer 512 which may carry out re-ordering in accordance with a hybrid automatic repeat request (HARQ) protocol, RLC header removal means 513 and SDU reassembly means 514. Upon reception for the UMD PDUs the receiving UM RLC entity 511 is configured to detect whether or not the UMD PDUs have been received in duplication, and discard duplicated UMD PDUs, reorder the UMD PDUs if they are received out of sequence, detect the loss of UMD PDUs at lower layers and avoid excessive reordering delays, reassemble RLC SDUs from the reordered UMD PDUs (not accounting for RLC PDUs for which losses have been detected) and deliver the RLC SDUs to upper layer in ascending order of the RLC sequence number (SN), and discard received UMD PDUs that cannot be re-assembled into a RLC SDU due to loss at lower layers of an UMD PDU which belonged to the particular RLC SDU. At the time of RLC re-establishment, the receiving UM RLC entity shall if possible, reassemble RLC SDUs from the UMD PDUs that are received out of sequence and deliver them to upper layer, discard any remaining UMD PDUs that could not be reassembled into RLC SDUs and initialise relevant state variables and stop relevant timers.

FIG. 6 shows an acknowledged mode (AM) RLC entity 601, comprising a transmission buffer 602, segmentation and concatenation means 603, RLC header addition means 604, retransmission buffer 605, RLC control means 606, routing means 607, a reception buffer 608 which may carry out re-ordering in accordance with a HARQ protocol, RLC removal means 609 and SDU reassembly means 610. When a transmitting side of an AM RLC entity forms AMD PDUs from RLC SDUs, it shall segment and/or concatenate the RLC SDUs so that the AMD PDUs fit within the total size of RLC PDU(s) indicated by lower layer at the particular transmission opportunity notified by lower layer. The transmitting side of an AM RLC entity supports retransmission of RLC data PDUs (ARQ). If the RLC data PDU to be retransmitted does not fit within the total size of RLC PDU(s) indicated by lower layer at the particular transmission opportunity notified by lower layer, the AM RLC entity can re-segment the RLC data PDU into AMD PDU segments and the number of re-segmentation is not limited. When the transmitting side of an AM RLC entity forms AMD PDUs from RLC SDUs received from upper layer or AMD PDU segments from RLC data PDUs to be retransmitted, it shall include relevant RLC headers in the RLC data PDU. When the receiving side of an AM RLC entity receives RLC data PDUs, it shall detect whether or not the RLC data PDUs have been received in duplication, and discard duplicated RLC data PDUs, reorder the RLC data PDUs if they are received out of sequence, detect the loss of RLC data PDUs at lower layers and request retransmissions to its peer AM RLC entity and reassemble RLC SDUs from the reordered RLC data PDUs and deliver the RLC SDUs to upper layer in sequence. At the time of RLC re-establishment, the receiving side of an AM RLC entity shall if possible, reassemble RLC SDUs from the RLC data PDUs that are received out of sequence and deliver them to upper layer, discard any remaining RLC data PDUs that could not be reassembled into RLC SDUs and initialise relevant state variables and stop relevant timers.

Layer 2 Relay

An advantage of having a relay at the RLC layer (layer 2) is data can be forwarded from the source to the target device without the data being decodable by the relay device—this is also one of the key requirements of the relay work. Access stratum (AS) security (ciphering and deciphering) is handled at the packet data convergence protocol (PDCP) layer, which sits directly above the RLC layer in layer 2 of the protocol stack. The RLC layer provides crucial ARQ functionality which is necessary to provide reliability. The RLC ARQ functionality corrects residual errors present after medium access control (MAC) layer HARQ corrections. HARQ in MAC provides a fast feedback mechanism which aims to reduce delay while correcting most of the errors with a small amount of overhead, while the ARQ provides a slower feedback mechanism which is necessary to provide robustness—ARQ has a larger overhead since the control PDUs are of a larger size, but since they are transmitted using HARQ, the feedback itself is more reliable.

Figure 7:
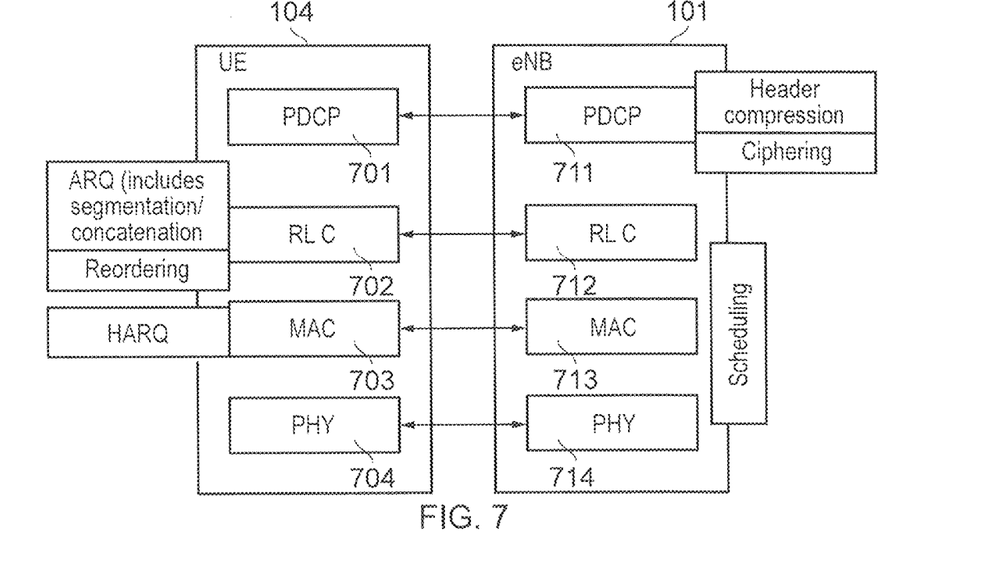
FIG. 7 displays diagrammatically the user-plane architecture for LTE systems.

The user-plane protocol architecture is shown in FIG. 7. Protocol architecture of a UE 104 comprises, at layer 2 of the protocol stack, a PDCP layer 701, an RLC layer 702 and a MAC layer 703, all above the physical layer 704 at layer 1 of the protocol stack. Likewise, protocol architecture of an eNodeB 101 comprises, at layer 2 of the protocol stack, a PDCP layer 711, an RLC layer 712 and a MAC layer 713, all above the physical layer 714 at layer 1 of the protocol stack. Data is able to be communicated between the PDCP layer 701 of the UE 104 and the PDCP layer 711 of the eNodeB 101, between the RLC layer 702 of the UE 104 and the RLC layer 712 of the eNodeB 101, between the MAC layer 703 of the UE 104 and the MAC layer 713 of the eNodeB 101 and between the physical layer 704 of the UE 104 and the physical layer 714 of the eNodeB 101.

As such—an obvious choice for a layer 2 relay would be to perform relaying functionality either at a PDCP entity before de-ciphering, or at an interface between an RLC entity and the PDCP entity. This is because the data needs to be forwarded before being de-ciphered, while the existing RLC functionality can be re-used in both the receive side operation and the transmit side operation.

However, a number of issues have been identified with re-using RLC, and in particular AM RLC. These include that the relay device needs to reserve two buffers—one for receiving and another for transmitting. The reception buffer is needed in order to store PDUs so that complete SDUs can be passed to the upper layer (or in the relay case, to be passed to the transmitting RLC). The transmission buffer is needed in case the receiver (a remote UE) transmits a negative acknowledgement (NACK) in response to any PDU transmission and so the transmitter needs to re-transmit. Each of those buffers needs to be managed using a polling mechanism, status reporting, and sliding window. This means that additional memory is required, as two buffers are needed to relay uplink data, and another two buffers are needed to relay downlink data.

Another issue is that a delay is introduced. In a case in which the RLC entity segments SDUs into multiple PDUs (in the normal case—RLC PDU size is set according to the transport block size determined by MAC layer, which is determined based on the channel conditions (smaller PDU when channel conditions are poorer—larger PDU when channel conditions are good)), the relay needs to wait for all PDUs of an SDU before it can be forwarded, which can introduce several milliseconds of delay.

There is an issue in regards to the processing requirement. The receiver needs to reassemble SDUs, remove headers, copy from reception to transmission buffer, then segment and transmit according to the forward link. Any extra processing implies power consumption.

There is a further issue with regard to protocol stalling. Taking the example of a high speed link from the eNodeB to the relay, and a lower speed link from the relay to the remote UE, the likelihood is that the relay buffer will become full because data cannot be sent out of the relay as quickly as it is received. When the buffer becomes full, no more data can be transmitted. This is known as protocol stalling. The eNodeB transmitting entity needs to be able to slow down transmission if the relay transmit buffer cannot transmit more data in order to clear the queue of data waiting to be sent before more data is received.

Single Buffer RLC for Relay

A first solution to these issues is described in co-pending European patent application number EP16169733.9, where a new type of RLC entity is introduced, which is specifically for relaying data. The RLC entity has a combined receive/transmit buffer which is managed simultaneously by keeping track of successfully transmitted PDUs and successfully received PDUs in the same buffer. Most of the RLC state variables, polling mechanism, and sliding window mechanism which exist today in the transmission and reception RLC operations are maintained, but the behaviour is combined to operate a single buffer (e.g. "transient buffer").

By combining the reception and transmission buffers in the relay, delay and processing overheads can be reduced. In addition, introducing a combination of functions currently present in the reception and transmission RLC window management, the quality of both radio links can be taken into account.

The RLC entity can receive and transmit simultaneously, and since the receiver does not need to reassemble SDUs before forwarding the data, the delay introduced by the relay entity is reduced to a single transmission time interval (TTI) (1 ms) regardless of the size of individual SDUs or PDUs because each PDU can be forwarded in the TTI after it was received, as long as the forward radio link conditions are acceptable. Since it is not necessary to copy data from one buffer to another, nor to perform any reassembly, processing effort can be minimised. Further to this, since only one buffer is necessary, the memory requirement is minimised. In addition, EP16169733.9 describes a number of approaches for polling strategy and RLC window management.

Figure 8:
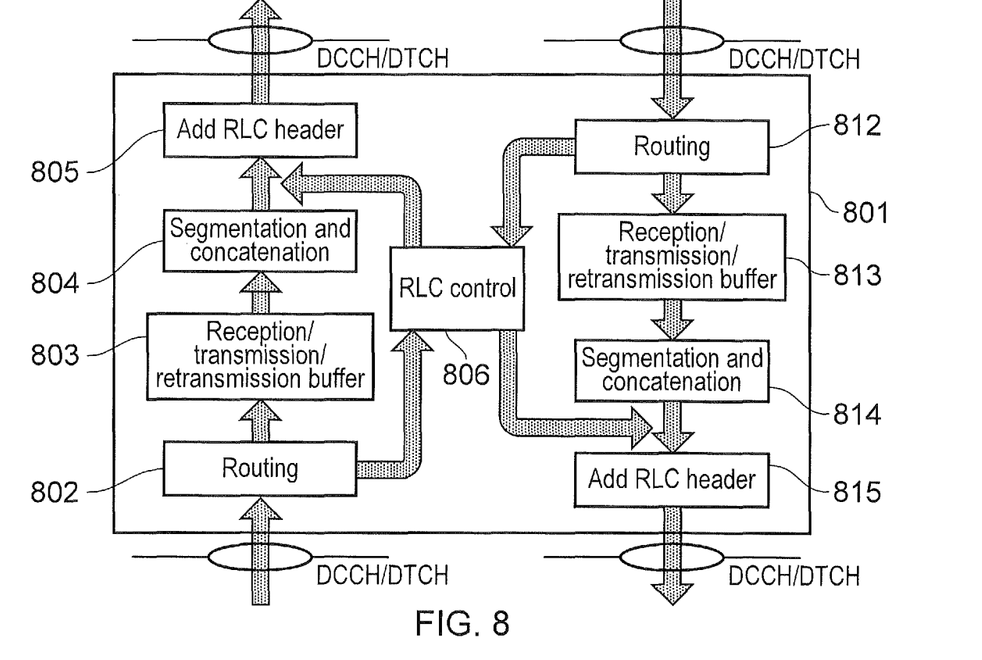
FIG. 8 shows a model of a single relay RLC acknowledged mode entity having a combined transmission and reception buffer.

FIG. 8 shows a model of a relay RLC acknowledged mode entity 801 as described in accordance with EP16169733.9. The relay RLC AM entity 801 comprises routing means 802, 812, single reception, transmission and retransmission buffers 803, 813, segmentation and concatenation means 804, 814, RLC header addition means 805, 815 and RLC control means 806. The relay RLC AM entity 801 is similar to the AM RLC model shown in FIG. 6, with the main difference being that there is a single buffer 803 for storing and managing both reception and transmission/retransmission in each direction (e.g. uplink may use the first routing means 802, first single reception, transmission and retransmission buffer 803, first segmentation and concatenation means 804 and first RLC header addition means 805, and downlink may use the second routing means 812, second single reception, transmission and retransmission buffer 813, second segmentation and concatenation means 814 and second RLC header addition means 815). The data is not passed to upper layers via the AM-SAP (acknowledged mode service access point) but is rather directly routed back to a lower layer (to the next radio link, whether this is relay device to remote device or relay device to eNodeB, depending on whether the relay device is operating on the downlink or on the uplink).

The routing function 802, 812 determines whether the received data is a data PDU or a control PDU. Data PDUs are sent directly to the buffer 803, 813 where they are stored. Control PDUs (containing ACK/NACK information sent back from a receiving entity to the relay entity 801 and sent from the relay entity 801 to a transmitting entity) are sent to and from the RLC control function 806—the control function updates the buffer window variables, performs retransmission, etc. based on this control feedback.

The segmentation and concatenation 804, 814 is required in order to re-segment RLC PDUs in case the forward link is not capable of transmitting the complete PDUs as received. The functionality is expected to be identical to the functionality in LTE RLC AM re-segmentation. The RLC header addition function 805, 815 is needed in case of re-segmentation. If the complete PDU as received can be sent in the transport block, then the same header may be used as in the received PDU.

Relay Having Independent Reception and Transmission RLC Entities

Figure 9:
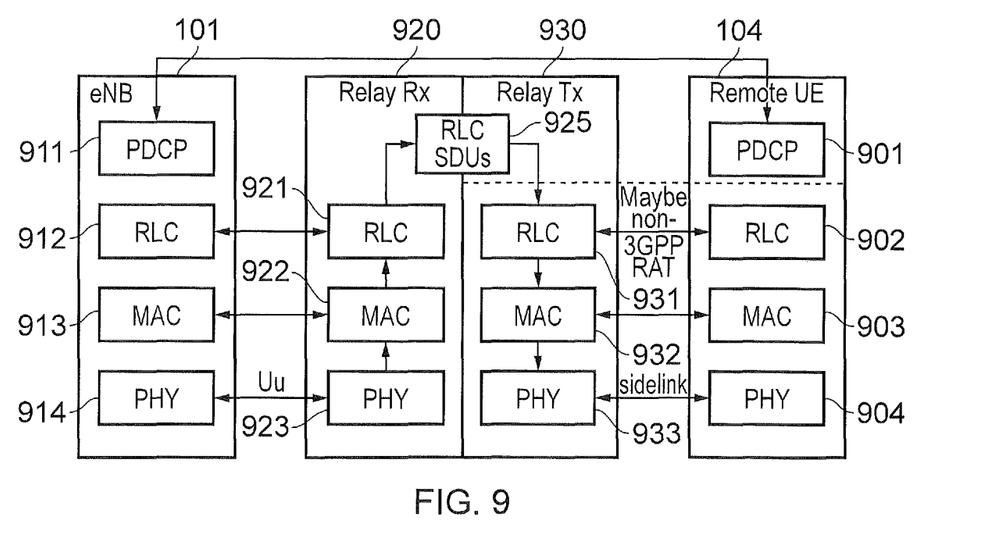
FIG. 9 displays diagrammatically a UE relay architecture, having two independent RLC entities, for LTE systems.

A second solution to these issues is to provide a relay device having two independent RLC entities, as shown in FIG. 9.

Similarly to FIG. 7, the protocol architecture of the UE 104 comprises, at layer 2 of the protocol stack, a PDCP layer 901, an RLC layer 902 and a MAC layer 903, all above the physical layer 904 at layer 1 of the protocol stack. Likewise, protocol architecture of an eNodeB 101 comprises, at layer 2 of the protocol stack, a PDCP layer 911, an RLC layer 912 and a MAC layer 913, all above the physical layer 914 at layer 1 of the protocol stack. Data is able to be communicated between directly between the PDCP layer 901 of the UE 104 and the PDCP layer 911 of the eNodeB 101 and, via a relay device, between the RLC layer 902 of the UE 104 and the RLC layer 912 of the eNodeB 101, between the MAC layer 903 of the UE 104 and the MAC layer 913 of the eNodeB 101 and between the physical layer 904 of the UE 104 and the physical layer 914 of the eNodeB 101.

The relay device is separated into a reception entity 920 and a transmission entity 930. The reception entity 920 comprises an RLC layer 921 for communicating data with the RLC layer 912 of the eNodeB 101, a MAC layer 922 for communicating data with the MAC 913 of the eNodeB 101, and a physical layer 933 for communicating data via the Uu interface with the physical layer 914 of the eNodeB 101. The transmission entity 930 comprises an RLC layer 931 for communicating data (not necessarily over a 3GPP network; other RATs such as Bluetooth® or Wi-Fi® may be used) with the RLC layer 902 of the remote UE 104, a MAC layer 932 for communicating data with the MAC layer 903 of the remote UE 104 and a physical layer 933 for communicating data via the PCS interface (sidelink) with the physical layer 904 of the remote UE 104, The relay device further comprises an interface 925 between the reception entity 920 and the transmission entity 930, The reception entity 920, on receiving; PDUs, combines them into SDUs and forwards them via the interface 925 to the transmission entity 930. which then re-seiments the SDUs into PDUs. The PDUs at the reception entity 920 do not necessarily have the same sequence number (i.e. may not be ordered in the same way) as those at the transmission entity 930; the two relay entities are independent of one another.

This approach, although lacking some of the advantages (with regards to reduced delay, requirement of buffer amount and reduced processing), is simpler than a single buffer RLC as described in EP16169733.9, in terms of re-using existing functionality. The reception and transmission RLC entities at the relay device would behave exactly the same as if they were working according to the regular LTE user plane described in FIG. 7 (eNodeB to UE direct link) and therefore may be more attractive (in terms of ease of assimilation) from a standards and implementation point of view.

It would be appreciated by those skilled in the art that although FIG. 9 is described with an eNodeB transmitting messages to a communications device (UE), the same techniques could apply for a UE transmitting messages to either an eNodeB or another UE.

Relay RLC Transmission Buffer Reporting Trigger

Embodiments of the present disclosure recognise that either of the above solutions (single buffer RLC and independent reception and transmission RLC entities for each radio link) may be employed. Accordingly, embodiments of the present technique introduce a method of triggering reporting of the relay transmission buffer status to the original transmitter, whether this transmission buffer is a separate transmission buffer or a combined single RLC buffer, driven by the relay and not in response to existing status report triggers. This is to provide a solution to the RLC transmission buffer becoming full due to receiving data from the transmitting node faster than it can be relayed—which is likely in case of the transmitting node being an eNodeB transmitting to the relay node using a physical downlink shared channel (PDSCH), and then relaying to a receiving device via a sidelink (such as the PC5 interface) which most probably supports a lower data rate than PDSCH.

Figure 10:
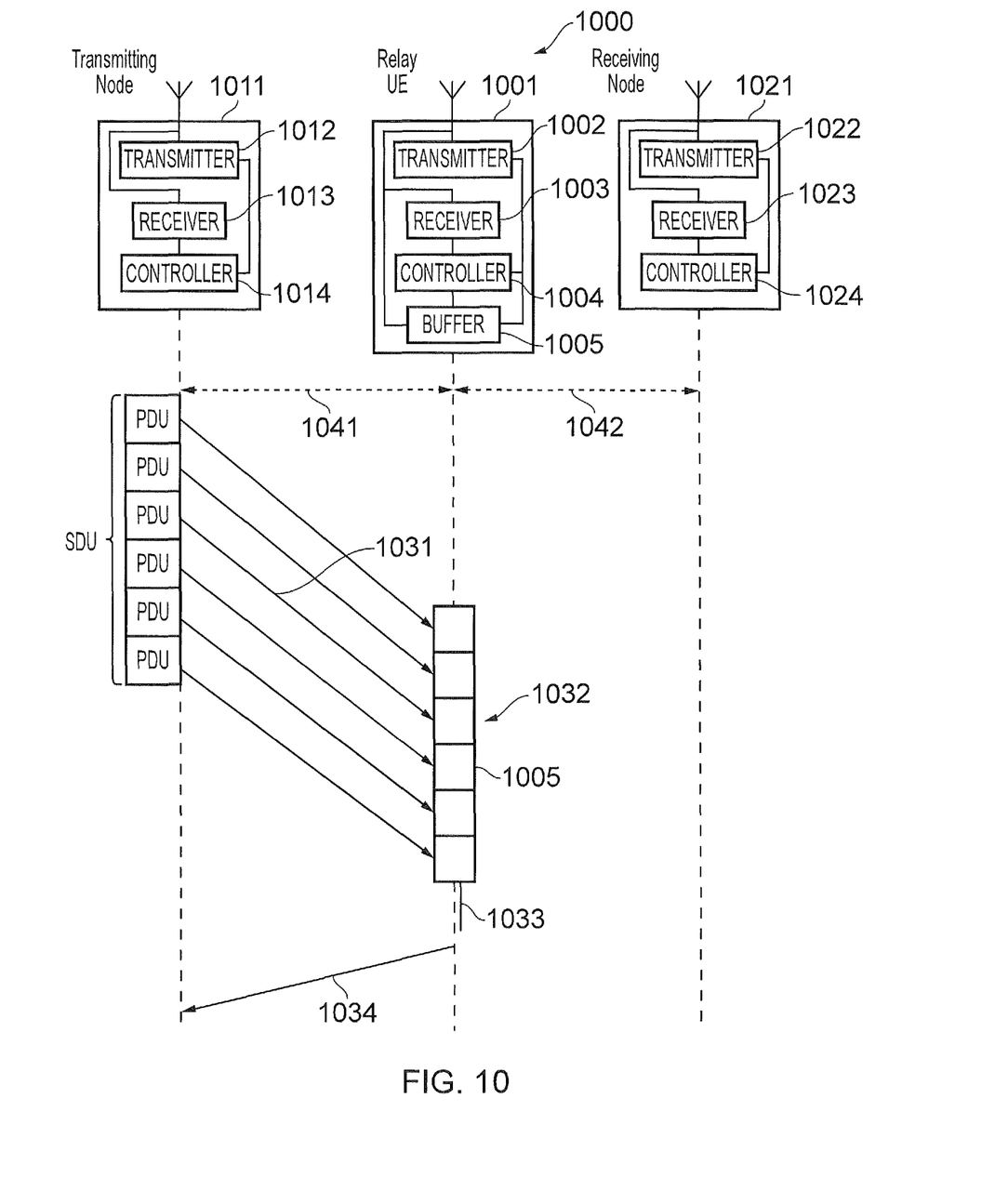
FIG. 10 is a part schematic representation, part message flow diagram of communications between a transmitting node, a receiving node and a relay node in accordance with embodiments of the present technique.

FIG. 10 is a part schematic block diagram of a mobile communications system 1000. The system comprises a communications device acting as a relay device 1001, a transmitting node 1011 operating with a mobile communications network and a receiving node 1021 of the mobile communications network, and part message flow diagram illustrating a process of communications between the communications device acting as the relay device (relay node) 1001, the transmitting node 1011 and the receiving node 1021 in accordance with embodiments of the present disclosure. Each of the relay node 1001, transmitting node 1011 and receiving node 1021 as shown in FIG. 10 comprise a transmitter (or transmitter circuitry) 1002, 1012, 1022, a receiver (or receiver circuitry) 1003, 1013, 1023 and a controller (or controller circuitry) 1004, 1014, 1024 to control the transmitter 1002, 1012, 1022 and receiver 1003, 1013, 1023. Each of the controllers 1004, 1014, 1024 may be, for example, a microprocessor, a CPU, or a dedicated chipset, etc. It will be appreciated by those skilled in the art that, in arrangements of the present technique, the receiving node 1021 may not always include a transmitter 1022. The relay node 1001 further comprises a buffer 1005. The transmitting node 1011 and the relay node 1001 are configured to communicate via a first wireless access interface 1041 according to a first automatic repeat request protocol, and the relay node 1001 and the receiving node 1021 are configured to communicate via a second wireless access interface 1042 according to a second automatic repeat request protocol.

The receiver 1003 of the relay node 1001 is configured in combination with the controller 1004 of the relay node 1001 to receive 1031 signals representing protocol data units formed from one or more service data units via the first wireless access interface 1041 from the transmitting node 1011 according to he first automatic repeat request protocol for transmission to the receiving node 1021. The buffer 1005 of the relay node 1001 is configured in combination with the controller 1004 of the relay node 1001 to store 1032 the protocol data units received by the receiver 1003 from the transmitting node 1011 according to the first automatic repeat request protocol. The controller 1004 of the relay node 1001 is configured in combination with the buffer 1005 of the relay node 1001 to determine 1033 whether the number of protocol data units or the number of bytes stored in the buffer 1005 exceeds a predetermined threshold. If this is the case, the controller 1004 of the relay node 1001 is configured in combination with the transmitter 1002 of the relay node 1001 to transmit to the transmitting node 1011 an indication 1034 that the number of protocol data units or the number of bytes stored in the buffer 1005 exceeds the predetermined threshold.

In embodiments of the present technique, the buffer 1005 is a combined transmit/receive buffer of a single RLC entity, and comprises a sliding window, wherein the stored protocol data units are cleared from the buffer 1005 whenever the buffer 1005 is advanced, such that once later space in the buffer 1005 has been filled, stored protocol data units have been cleared from the buffer 1005 in order to make space for the reception of future protocol data units. In these embodiments, protocol data units are each transmitted from the relay node having a sequence number defining their position in a predetermined order, a higher sequence number being transmitted after a lower sequence number. The sliding window of the buffer represents protocol data units which have been transmitted by the relay node but not yet successfully acknowledged by the receiving node. An upper edge of the sliding window is set to a first value equal to a sequence number to be assigned for a next newly generated protocol data unit at the relay node and a lower edge of the sliding window is set to a second value equal to a sequence number of a next protocol data unit for which a successful acknowledgement is to be received from the receiving node in the predetermined order. The communications device acting as the relay device is configured to receive from the receiving node an indication that one or more of the protocol data units have not been successfully received by the receiving node, to retransmit from the buffer the one or more of the protocol data units which have not been successfully received to the receiving node, and to advance the sliding window according to the second value, such that memory of the buffer is freed at locations at which are stored each of the protocol data units in the predetermined order which have been successfully received before the one or more protocol data units which have not been successfully received. The second value may then be transmitted by the communications device acting as the relay device to the transmitting node. In an arrangement of this embodiment, the relay node 1001 may report to the transmitting node 1011 the maximum transport block size or PDU size that can be transmitted from the relay node 1001 to the receiving node 1021. Then, the transmitting node 1011 can segment RLC PDUs according to the size that can be transmitted on the D2D link. An alternative (or in addition) the relay node 1001 can re-segment received PDUs into PDU segments (see [4]) in order to fit those into the D2D link transport blocks. The above described mechanism for reporting buffer occupancy will help to avoid the buffer at the relay filling too much and causing protocol stalling.

In embodiments of the present technique, the relay node 1001 may have independent transmission and reception RLC entities, each with their own buffer. In this case, the buffer 1005 is a first buffer, the first buffer being a transmission buffer configured to store data representing the receive protocol data units formed from the one or more service data units received from the receiver for transmission to the receiving node according to the second automatic repeat request process from a second buffer, the second buffer being a reception buffer. The protocol data units in the reception buffer may therefore be the same size or a different size to the protocol data units in the transmission buffer and so the protocol data units in the transmission buffer may be stored as data representing the received protocol data units.

The transmitting relay RLC entity (whether a part of a single RLC entity or independent from a receiving relay RLC) is configured with a threshold buffer occupancy (that is, the percentage of the RLC buffer being used to store data, or "window" or an absolute amount). When the window exceeds the threshold, then a report is sent back to the original transmitting entity via the relay receiving RLC entity (whether a part of a single RLC entity or independent from the transmitting relay RLC) and protocol.

In embodiments of the present disclosure, some interaction is introduced between RLC entities. In the RLC transmitter buffer variables can be reported back via the receiving RLC entity, most likely as part of the status report (similarly to that described in EP16169733.9). A novel approach introduced by embodiments of the present technique is to include an event trigger which forces the STATUS report to be generated by the receiver, rather than use any of the existing triggers (e.g. response to poll or reordering timer expiry). In case the sidelink uses a non-3GPP RAT such as Bluetooth® or Wi-Fi®, some additional variables which keep track of at least the window size, and potentially an intermediate buffer needs to be introduced, which would use the same mechanism for checking whether the huller is being filled more quickly than data would be relayed. The report may also just be a one bit indication to report that the window size is exceeding the threshold. The transmitting node may then slow down its transmission until this event stops being reported.

Taking LTE as an example, the following variables are already maintained for the transmitting RLC entity The transmitting side of each AM RLC entity shall maintain the following state variables:

a) VT(A)—Acknowledgement state variable

This state variable holds the value of the SN of the next AMD PDU for which a positive acknowledgment is to be received in-sequence, and it serves as the lower edge of the transmitting window. It is initially set to 0, and is updated whenever the AM RLC entity receives a positive acknowledgment for an AMD PDU with SN=VT(A).

b) VT(MS)—Maximum send state variable

This state variable equals VT(A)+AM_Window_Size, and it serves as the higher edge of the transmitting window.

The above two variables essentially define the size of the window (a predetermined threshold of the number of protocol data units or number of bytes that can be stored at any one time). What embodiments of the present disclosure add to this is a threshold window size, which when exceeded at the transmitting RLC entity (or intermediate buffer in case of non-3GPP sidelink) will trigger the receiving RLC entity to send a status report (an indication that the number of protocol data units or number of bytes stored in the buffer exceeds the predetermined threshold). The status report will include information such as that described in EP16169733.9. The threshold window size may still be configurable by the eNodeB as part of relay RLC parameters.

Embodiments of the present technique apply both in the case of independent transmit and received RLC entities in the relay, as well as for the single buffer relay. They can apply regardless of whether PDCP PDUs are forwarded, RLC SDUs or PDUs. What is added by embodiments of the present technique is the threshold window size at the transmitting RLC buffer which triggers a status report to the original transmitter and does not rely on piggybacking the information on status reports which have been triggered using other means, such as polling.

Figure 11:
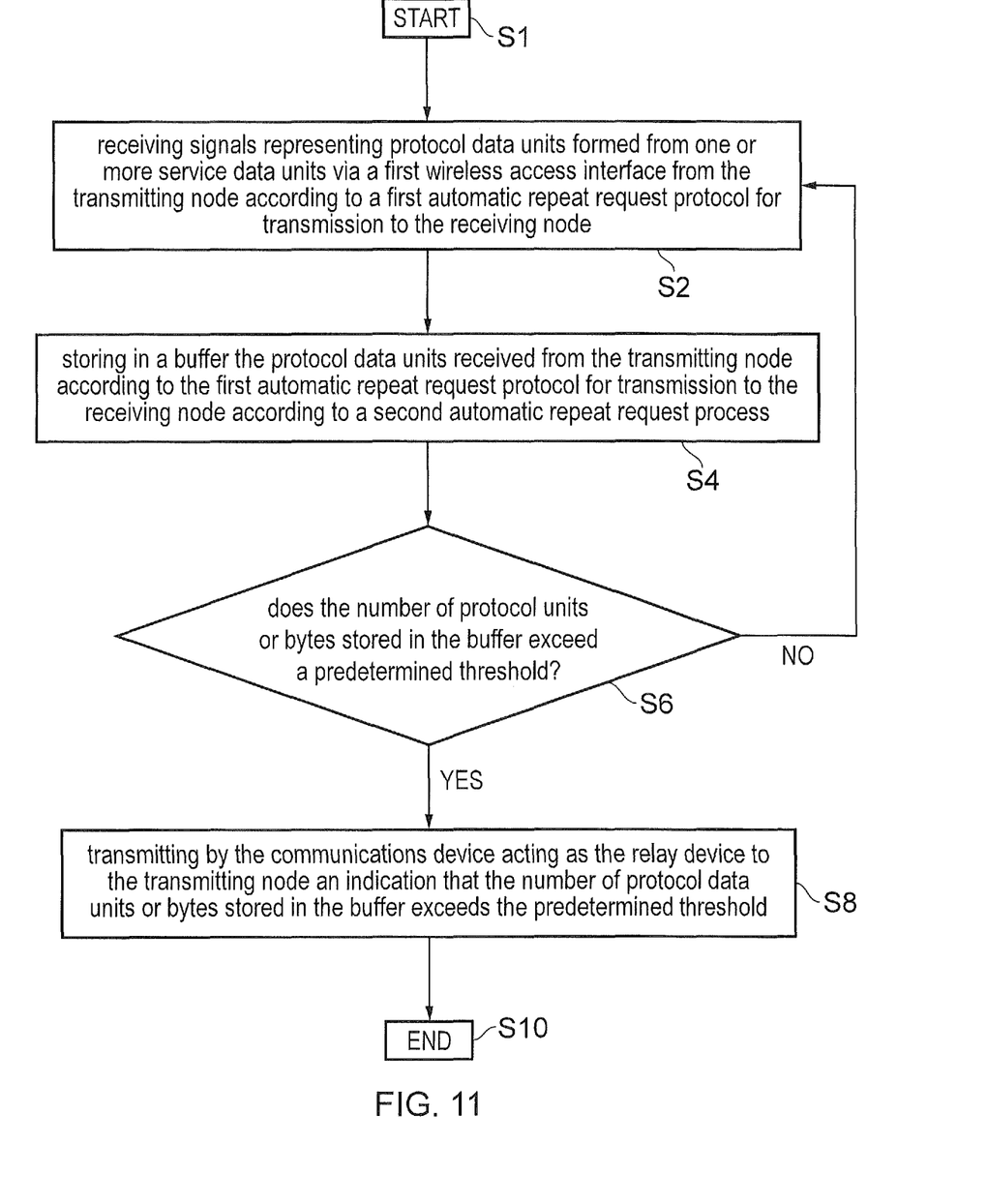
FIG. 11 shows a flow diagram illustrating a process of communications between a transmitting node, a receiving node and a relay node in accordance with embodiments of the present technique.

FIG. 11 shows a flow diagram illustrating a process of communications between a transmitting node, a receiving node and a relay node in accordance with embodiments of the present technique. The method begins in step S1. The method comprises, in step S2, receiving signals representing protocol data units formed from one or more service data units via a first wireless access interface from the transmitting node according to a first automatic repeat request protocol for transmission to the receiving node. The method then comprises in step S4, storing in a buffer the protocol data units received from the transmitting node according to the first automatic repeat request protocol for transmission to the receiving node according to a second automatic repeat request process. In step S6, the process comprises determining whether the number of protocol data units or number of bytes stored in the buffer exceeds a predetermined threshold. If this is not the case the method moves back to step S2, as the relay node is ready to receive more data. However, if this is the case, then the method advances to step S8, which comprises transmitting by the communications device acting as the relay device to the transmitting node an indication that the number of protocol data units or the number of bytes stored in the buffer exceeds the predetermined threshold. The process ends in step S10.

Although the above described embodiments of the present technique deal primarily with the relaying of downlink transmissions from an infrastructure equipment of a mobile communications network to a remote (communications) device, it should be clear to those reading that embodiments of the present technique may also include the relaying of signals on the uplink received by the relay device from a transmitting remote communications device and relayed to the infrastructure equipment, or the D2D relaying of signals between two communications devices.

Advantages of embodiments of the present technique include that they ensure that a transmit buffer at the relay exceeding a threshold window size can be reported to the original transmitter in order to avoid the buffer completely filling up. If embodiments of the present technique are applied specifically to the independent transmitter and receiver RLC entity option, the overall system is simpler from an implantation point of view as fewer changes are required to the existing RLC functionality.

The following numbered paragraphs provide further example aspects and features of the present technique:

Paragraph 1. A communications device acting as a relay device configured to communicate with a transmitting node operating with a mobile communications network and a receiving node operating with the mobile communications network, the communications device acting as the relay device comprising
  receiver circuitry configured to receive signals representing protocol data units formed from one or more service data units via a first wireless access interface from the transmitting node according to a first automatic repeat request process for transmission to the receiving node,
  transmitter circuitry configured to transmit data conveyed by or representing the received protocol data units via a second wireless access interface to the receiving node according to a second automatic repeat request process,
  controller circuitry configured to control the transmitter circuitry to transmit the signals and to control the receiver circuitry to receive the signals to transmit, and
  a buffer configured to store data conveyed by or representing the received protocol data units for transmission to the receiving node according to the second automatic repeat request process,
  wherein if the data representing a number of the received protocol data units or number of bytes stored in the buffer exceeds a predetermined threshold, the controller circuitry is configured in combination with the transmitter circuitry and the buffer
  to transmit to the transmitting node an indication that data representing the received protocol data units as a number of protocol data units or the number of bytes stored in the buffer exceeds the predetermined threshold.

Paragraph 2. A communications device acting as a relay device according to paragraph 1, wherein the transmitting node is a communications device and the receiving node is an infrastructure equipment of the mobile communications network.

Paragraph 3. A communications device acting as a relay device according to paragraph 1, wherein the transmitting node is an infrastructure equipment of the mobile communications network and the receiving node is a communications device.

Paragraph 4. A communications device acting as a relay device according to paragraph 1, wherein the transmitting node and the receiving node are each a communications device.

Paragraph 5. A communications device acting as a relay device according to any of paragraphs 1 to 4,
  wherein the data conveyed by or representing the received protocol data units is transmitted from the communications device acting as the relay device as second protocol data units having a sequence number defining their position in a predetermined order, a higher sequence number being transmitted after a lower sequence number,
  wherein the buffer comprises a sliding window which represents protocol data units which have been transmitted by the communications device acting as the relay device but not yet successfully acknowledged by the receiving node, an upper edge of the sliding window being set to a first value equal to a sequence number to be assigned for a next newly generated protocol data unit at the communications device acting as the relay device and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer to receive from the receiving node an indication that one or more of the second protocol data units have not been successfully received by the receiving node, to retransmit from the buffer the one or more of the second protocol data units which have not been successfully received to the receiving node, and to advance the sliding window according to the second value, such that memory of the buffer is freed at locations at which are stored each of the second protocol data units in the predetermined order which have been successfully received before the one or more second protocol data units which have not been successfully received.

Paragraph 6. A communications device acting as a relay device according to paragraph 5, wherein the amount of data of the second protocol data units the same as the received protocol data units.

Paragraph 7. A communications device acting as a relay device according to paragraph 5, wherein the controller circuitry is configured to combination with the transmitter circuitry to transmit the second value to the transmitting node.

Paragraph 8. A communications device acting as a relay device according to any of paragraphs 1 to 7, wherein the controller circuitry is configured in combination with the transmitter circuitry to transmit to the transmitting node an indication of a maximum protocol data unit size that can be transmitted from the communications device acting as the relay device to the receiving node.

Paragraph 9. A communications device acting as a relay device according to any of paragraphs 1 to 8, wherein the buffer is a first buffer, the first buffer being a transmission buffer configured to store the protocol data units formed from the one or more service data units received from the receiver circuitry for transmission to the receiving node as the data representing the received protocol data units according to the second automatic repeat request process from a second buffer, the second buffer being a reception buffer.

Paragraph 10. A communications device acting as a relay device according to paragraph 9, wherein the one or more service data units, before being received by the first buffer, are formed from protocol data units at the second buffer corresponding to the protocol data units received at the first buffer, wherein sequence numbers of the protocol data units at the second buffer are different to the sequence numbers of the protocol data units received at the first buffer.

Paragraph 11. A method of operating a communications device acting as a relay device configured to communicate with a transmitting node operating with a mobile communications network and a receiving node operating with the mobile communications network, the method comprising receiving signals representing protocol data units formed from one or more service data units via a first wireless access interface from the transmitting node according to a first automatic repeat request protocol for transmission to the receiving node, storing in a buffer data conveyed by or representing the protocol data units received from the transmitting node according to the first automatic repeat request protocol for transmission to the receiving node according to a second automatic repeat request process, wherein if the data conveyed by or representing the received protocol data units as a number of protocol data units or number of bytes stored in the buffer exceeds a predetermined threshold, the method comprises transmitting by the communications device acting as the relay device to the transmitting node an indication that the data representing the number of protocol data units or the number of bytes stored in the buffer exceeds the predetermined threshold.

Paragraph 12. A mobile communications system comprising a communications device acting as a relay device, a transmitting node operating with a mobile communications network and a receiving node operating with the mobile communications network, the communications device acting as the relay device configured to communicate with the transmitting node and with the receiving node, and the communications device acting as the relay device comprising receiver circuitry configured to receive signals representing protocol data units formed from one or more service data units via a first wireless access interface from the transmitting node according to a first automatic repeat request process for transmission to the receiving node, transmitter circuitry configured to transmit signals representing the received protocol data units via a second wireless access interface to the receiving node according to a second automatic repeat request process, controller circuitry configured to control the transmitter circuitry to transmit the signals and to control the receiver circuitry to receive the signals to transmit, and a buffer configured to store data conveyed by or representing the protocol data units received by the receiver circuitry for transmission to the receiving node according to the second automatic repeat request process, wherein if the data conveyed by or representing a number of the received protocol data units or number of bytes stored in the buffer exceeds a predetermined threshold, the controller circuitry is configured in combination with the transmitter circuitry and the buffer to transmit to the transmitting node an indication that the data representing the number of protocol data units or the number of bytes stored in the buffer exceeds the predetermined threshold.

Paragraph 13. A mobile communications system according to paragraph 11, wherein the transmitting node is a communications device and the receiving node is an infrastructure equipment of the mobile communications network.

Paragraph 14. A mobile communications system according to paragraph 11, wherein the transmitting node is an infrastructure equipment of the mobile communications network and the receiving node is a communications device.

Paragraph 15. A mobile communications system according to paragraph 11, wherein the transmitting node and the receiving node are each a communications device.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160677, "Further Enhancements to LTE Device to Device, UE to Network Relays for IoT and Wearables," Qualcomm et al, RAN #71.
[4] TS 36.322, "Evolved Universal Terrestrial Radio Access (E-UTRA); Radio Link Control (RLC) protocol specification," 3GPP.
[5] TS 36.306, "Evolved Universal Terrestrial Radio Access (E-UTRA); User Equipment (UE) radio access capabilities," 3GPP.

What is claimed is:

1. A communications device acting as a relay device configured to communicate with a transmitting node operating with a mobile communications network and a receiving node operating with the mobile communications network, the communications device acting as the relay device comprising
 receiver circuitry configured to receive signals representing protocol data units formed from one or more service data units via a first wireless access interface from the transmitting node according to a first automatic repeat request process for transmission to the receiving node,
 transmitter circuitry configured to transmit data conveyed by or representing the received protocol data units via a second wireless access interface to the receiving node according to a second automatic repeat request process,
 controller circuitry configured to control the transmitter circuitry to transmit the signals and to control the receiver circuitry to receive the signals to transmit, and
 a buffer configured to store data conveyed by or representing the received protocol data units for transmission to the receiving node according to the second automatic repeat request process, wherein the second automatic request process is a hybrid automatic request process,
 wherein based on the data representing a number of the received protocol data units or number of bytes stored in the buffer exceeds a predetermined threshold, the controller circuitry is configured in combination with the transmitter circuitry and the buffer
 to transmit to the transmitting node an indication that data representing the received protocol data units as a number of protocol data units or the number of bytes stored in the buffer exceeds the predetermined threshold,
 wherein the buffer is a first buffer, the first buffer being a transmission buffer configured to store the protocol data units formed from the one or more service data units received from the receiver circuitry for transmission to the receiving node as the data representing the received protocol data units according to the second automatic repeat request process from a second buffer, the second buffer being a reception buffer, and the second buffer is separate from the first buffer.

2. The communications device acting as the relay device as claimed in claim 1, wherein the transmitting node is a communications device and the receiving node is an infrastructure equipment of the mobile communications network.

3. The communications device acting as the relay device as claimed in claim 1, wherein the transmitting node is an infrastructure equipment of the mobile communications network and the receiving node is a communications device.

4. The communications device acting as the relay device as claimed in claim 1, wherein the transmitting node and the receiving node are each a communications device.

5. The communications device acting as the relay device as claimed in claim 1,
 wherein the data conveyed by or representing the received protocol data units is transmitted from the communications device acting as the relay device as second protocol data units having a sequence number defining their position in a predetermined order, a higher sequence number being transmitted after a lower sequence number,
 wherein the buffer comprises a sliding window which represents protocol data units which have been transmitted by the communications device acting as the relay device but not yet successfully acknowledged by the receiving node, an upper edge of the sliding window being set to a first value equal to a sequence number to be assigned for a next newly generated protocol data unit at the communications device acting as the relay device and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer
 to receive from the receiving node an indication that one or more of the second protocol data units have not been successfully received by the receiving node,
 to retransmit from the buffer the one or more of the second protocol data units which have not been successfully received to the receiving node, and to advance the sliding window according to the second value, such that memory of the buffer is freed at locations at which are stored each of the second protocol data units in the predetermined order which have been successfully received before the one or more second protocol data units which have not been successfully received.

6. The communications device acting as the relay device as claimed in claim 5, wherein an amount of data of the second protocol data units is the same as the received protocol data units.

7. The communications device acting as the relay device as claimed in claim 5, wherein the controller circuitry is configured to in combination with the transmitter circuitry to transmit the second value to the transmitting node.

8. The communications device acting as the relay device as claimed in claim 1, wherein the controller circuitry is configured in combination with the transmitter circuitry to transmit to the transmitting node an indication of a maximum protocol data unit size that can be transmitted from the communications device acting as the relay device to the receiving node.

9. The communications device acting as the relay device as claimed in claim 8, wherein the one or more service data units, before being received by the first buffer, are formed from protocol data units at a second buffer corresponding to the protocol data units received at the first buffer, wherein sequence numbers of the protocol data units at the second buffer are different to the sequence numbers of the protocol data units received at the first buffer.

10. The communications device acting as a relay device as claimed in claim 1, wherein the transmitting node and the receiving node are each a user equipment.

11. A method of operating a communications device acting as a relay device configured to communicate with a transmitting node operating with a mobile communications network and a receiving node operating with the mobile communications network, the method comprising
receiving signals representing protocol data units formed from one or more service data units via a first wireless access interface from the transmitting node according to a first automatic repeat request protocol for transmission to the receiving node,
storing in a buffer data conveyed by or representing the protocol data units received from the transmitting node according to the first automatic repeat request protocol for transmission to the receiving node according to a second automatic repeat request process, wherein the second automatic request process is a hybrid automatic request process,
wherein based on the data conveyed by or representing the received protocol data units as a number of protocol data units or number of bytes stored in the buffer exceeds a predetermined threshold, the method comprises transmitting by the communications device acting as the relay device to the transmitting node an indication that the data representing the number of protocol data units or the number of bytes stored in the buffer exceeds the predetermined threshold,
wherein the buffer is a first buffer, the first buffer being a transmission buffer configured to store the protocol data units formed from the one or more service data units that are received for transmission to the receiving node as the data representing the received protocol data units according to the second automatic repeat request process from a second buffer, the second buffer being a reception buffer, and the second buffer is separate from the first buffer.

12. Circuitry for a communications device acting as a relay device configured to communicate with a transmitting node operating with a mobile communications network and a receiving node operating with the mobile communications network, the communications device acting as the relay device comprising
receiver circuitry configured to receive signals representing protocol data units formed from one or more service data units via a first wireless access interface from the transmitting node according to a first automatic repeat request protocol for transmission to the receiving node,
transmitter circuitry configured to transmit signals representing the received protocol data units via a second wireless access interface to the receiving node according to a second automatic repeat request protocol,
controller circuitry configured to control the transmitter circuitry to transmit the signals and to control the receiver circuitry to receive the signals to transmit, and
a buffer configured to store data conveyed by or representing the protocol data units received by the receiver circuitry for transmission to the receiving node according to the second automatic repeat request process, wherein the second automatic request process is a hybrid automatic request process,
wherein based on the data conveyed by or representing a number of the received protocol data units or number of bytes stored in the buffer exceeds a predetermined threshold, the controller circuitry is configured in combination with the transmitter circuitry and the buffer
to transmit to the transmitting node an indication that the number of protocol data units or the number of bytes stored in the buffer exceeds the predetermined threshold,
wherein the buffer is a first buffer, the first buffer being a transmission buffer configured to store the protocol data units formed from the one or more service data units received from the receiver circuitry for transmission to the receiving node as the data representing the received protocol data units according to the second automatic repeat request process from a second buffer, the second buffer being a reception buffer, and the second buffer is separate from the first buffer.

* * * * *